(12) United States Patent
Valinejadshoubi et al.

(10) Patent No.: US 10,684,041 B2
(45) Date of Patent: Jun. 16, 2020

(54) SOLAR WINDOW SYSTEM FOR HEAT PRODUCTION AND STORAGE AND/OR AIR CONDITIONING

(71) Applicants: Masoud Valinejadshoubi, Mazandaran (IR); Mannan Ghanizadehgrayli, Mazandaran (IR)

(72) Inventors: Masoud Valinejadshoubi, Mazandaran (IR); Mannan Ghanizadehgrayli, Mazandaran (IR)

(*) Notice: Subject to any disclaimer, the term of this patent is extended or adjusted under 35 U.S.C. 154(b) by 205 days.

(21) Appl. No.: 15/800,059

(22) Filed: Oct. 31, 2017

(65) Prior Publication Data

US 2018/0066870 A1 Mar. 8, 2018

(51) Int. Cl.
| | |
|---|---|
| *F24S 20/63* | (2018.01) |
| *F24F 5/00* | (2006.01) |
| *F24S 70/65* | (2018.01) |
| *F24S 10/70* | (2018.01) |
| *F24S 60/00* | (2018.01) |
| *F24S 50/00* | (2018.01) |
| *F24S 20/66* | (2018.01) |
| *F24S 20/00* | (2018.01) |
| *F24S 80/00* | (2018.01) |

(52) U.S. Cl.
CPC ............ *F24S 20/63* (2018.05); *F24F 5/0046* (2013.01); *F24S 10/70* (2018.05); *F24S 20/66* (2018.05); *F24S 50/00* (2018.05); *F24S 60/00* (2018.05); *F24S 70/65* (2018.05); *F05B 2260/24* (2013.01); *F24F 2005/0064* (2013.01); *F24S 2020/18* (2018.05); *F24S 2080/05* (2018.05); *Y02A 30/272* (2018.01); *Y02B 10/20* (2013.01); *Y02B 10/24* (2013.01); *Y02E 10/44* (2013.01); *Y02E 10/465* (2013.01)

(58) Field of Classification Search
CPC ............ F24S 20/63; F24S 10/70; Y02B 10/20
See application file for complete search history.

(56) References Cited

U.S. PATENT DOCUMENTS

| | | | | |
|---|---|---|---|---|
| 4,021,895 | A * | 5/1977 | Morse ............... | F24S 90/00 126/640 |
| 4,088,121 | A * | 5/1978 | Lapeyre ............ | F24S 23/70 126/606 |
| 4,227,515 | A * | 10/1980 | Jacob ................ | F24D 11/003 126/592 |
| 4,267,822 | A * | 5/1981 | Diamond .......... | F24S 10/25 126/587 |
| 4,373,573 | A * | 2/1983 | Madwed ........... | F24F 5/0046 165/236 |

(Continued)

*Primary Examiner* — Jason Lau
(74) *Attorney, Agent, or Firm* — NovoTechIP International PLLC

(57) ABSTRACT

A solar window system for a building is provided. The solar window system includes multiple heat generation encasements. Air inside each heat generation encasement is heated by solar energy. The solar window system further includes a storage tank for storing heat from the heated air. The solar window system also includes a set of connection pipes, wherein the set of connection pipes draw cold air from an indoor space inside the building into the plurality of heat generation encasements, connect each of the heat generation encasements to at least two other heat generation encasements, and transfer the heated air from the set of heat generation encasements to the storage tank.

17 Claims, 21 Drawing Sheets

(56) References Cited

U.S. PATENT DOCUMENTS

| | | | | |
|---|---|---|---|---|
| 5,596,981 A | * | 1/1997 | Soucy | E06B 3/6612 |
| | | | | 126/704 |
| 2008/0092456 A1 | * | 4/2008 | Millett | C09K 9/02 |
| | | | | 52/1 |
| 2008/0098759 A1 | * | 5/2008 | Kuo | F24D 5/005 |
| | | | | 62/235.1 |
| 2015/0194926 A1 | * | 7/2015 | Bushong, Jr. | H02S 40/44 |
| | | | | 136/248 |

* cited by examiner

SOLAR WINDOW SYSTEM FOR HEAT PRODUCTION AND STORAGE AND/OR AIR CONDITIONING

TECHNICAL FIELD

The present application relates generally to harnessing solar energy and, more particularly, to a solar window system for providing light to indoor spaces while storing solar energy and using the stored energy for providing heating, air conditioning, air filtration, and/or air circulation using a solar chimney.

BACKGROUND

Renewable sources of energy such as sunlight provide opportunities for conservation of energy in various geographic areas. This type of energy coming from natural resources provides environment friendly energy. As the amount of reserves of fossil fuel decreases, production cost of fossil energy increases. On the other hand, with increase in world population consumption of fossil fuel endangers the environment with increased pollution and contributes to global warming. Increase in the amount of greenhouse gases is causing climate change.

Solar energy is one of the cheapest and most available renewable energies. However, only 0.23 percent of the total world energy consumption is produced using solar energy. In recent years new applications of solar energy are implemented with the hope of achieving environmental stability. One of the applications of solar energy is using solar energy for heating indoor spaces. Solar energy provides light and heat, however, known systems using solar energy usually produce either heat or light from the solar energy. Heat production from solar energy has attracted more attention than light production. Statistical data suggest that 20 to 50 percent of energy consumption in residential and commercial buildings is for lighting purposes. In some cases, savings in energy used for lighting the buildings may cause up to 80 percent lower energy consumption. In addition to heat and light, sun light can disinfect air and surfaces and improve emotional health and wellbeing of people.

Most known solar heaters currently used are single purpose and generate either heat or lighting from solar energy. These known systems include devices installed in buildings in addition to the typical building components and do not provide air filtration, air circulation, and air conditioning. Therefore, there is a need for a multifunctional system to be installed on buildings as a building components such as windows and while providing light to the building as windows, provide heat in cold weather, air filtration, and air conditioning in hot weather from solar energy and store the generated heat for further use or release the extra heat via solar chimneys.

SUMMARY

In one general aspect, the instant application describes a solar window system for a building. The solar window system includes a set of heat generation encasements, wherein air inside each heat generation encasement is heated by solar energy; a storage tank for storing the heated air; and a set of connection pipes. The set of connection pipes are configured to: draw cold air from an indoor space inside the building into the set of heat generation encasements, connect each of the set of heat generation encasements to at least two other heat generation encasements from the set of heat generation encasements, and transfer the heated air from the set of heat generation encasements to the storage tank. At least one of the set of heat generation encasements is directly connected to four sets of heat generation encasements via the set of connections pipes The above general aspect may include one or more of the following features. The storage tank may include an outer storage made from metal; an inner storage made from metal and filled with sand, metal filings, or a mixture of sand and metal fillings to store the heated air, wherein an empty space separates the inner storage and the outer storage; and a porous layer through which the heated air is transferred from the storage tank to the indoor space inside the building.

The solar window system may further include a fan installed at an entrance point to the storage tank where the heated air from the set of heat generation encasements enters the storage tank via the connection pipes, such that the fan provides circulation of the heated air to the indoor space inside the building. The fan can be a timer fan. The solar window system may further include a filter installed at the entrance point to the storage tank in front of the fan, such that the heated air circulated by the fan passes through the filter and purifies prior to entering the storage tank.

At least one of the set of heat generation encasements may be a concrete cylinder (e.g., reinforced concrete) and may include two glass sheets each covering one of two ends of the concrete cylinder; a metal sheet covering inside of the concrete cylinder to produce heat from sunlight; and an insulation layer placed between the concrete cylinder and the metal sheet to prevent heating of the concrete cylinder.

The two glass sheets may be anti-reflective glass sheets and provide light to the indoor space. The one of the two glass sheets may face sunlight with a predefined angle to provide maximum absorption of solar energy for heating the air inside the heat generation encasement. The predefined angle may be determined based on a latitude of the building location. In some locations the optimal angle can 43 degrees. The metal sheet may have a matt dark color for high absorption of solar energy. The metal sheet may cover inner surface of the concrete cylinder with a gap between the metal sheet and the concrete cylinder on each end of the metal sheet. The gap may be filled with flexible insulators to allow the metal sheet to expand when heated.

The drawing of the cold air from the indoor space may be performed by a first subset of connection pipes from the set of connection pipes, connecting each of the heat generation encasements to at least two other heat generation encasements may be performed by a second subset of connection pipes and transferring the heated air from the heat generation encasements to the storage tank may be performed by a third subset of connection pipes, and the first subset of connection pipes and the third subset of connection pipes may have larger diameters than the second subset of connection pipes. The first subset of connection pipes from the set of connection pipes may be located closer to a ground level compared to other connection pipes from the set of connection pipes. The solar window system may further include a solar chimney including a set of exhaust pipes and a chimney control switch. When the chimney control switch is turned on, the set of exhaust pipes are opened and the heated air from the set of heat generation encasements may be released outside the building. The pipes transferring the hot air have metal outer layers. These pipes can provide structural support for encasements weight and balance the load of solar window system on the building.

The solar window system may further include a storage control switch. When the storage control switch is turned off, the transfer of the heated air from the set of heat generation encasements to the storage tank may be stopped. The storage control switch may be automatically turned off when the chimney control switch is turned on.

The solar window system may further include an input control switch. When the input control switch is turned off, drawing the cold air from the indoor space inside the building into the set of heat generation encasements may be stopped. The storage control switch and the chimney control switch may be automatically turned off when the input control switch is turned off.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

Figure 1:
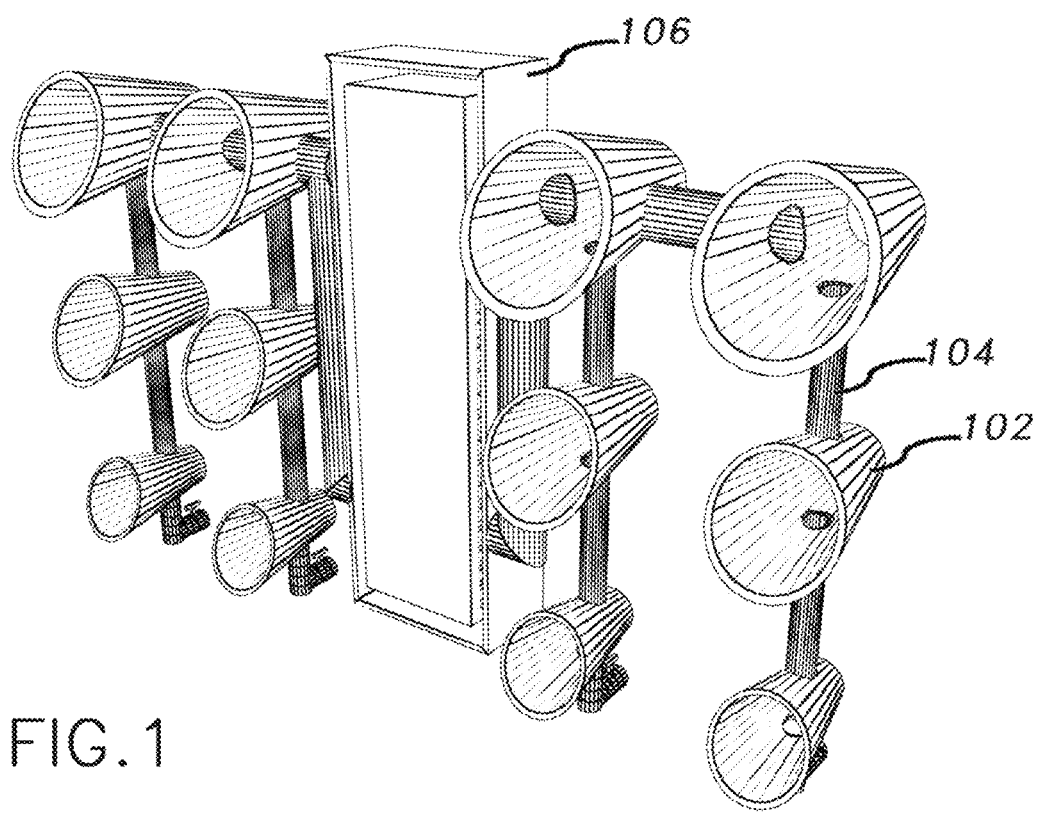
FIGS. 1-4 illustrate heat generating solar windows disclosed by prior art.
Figure 2:
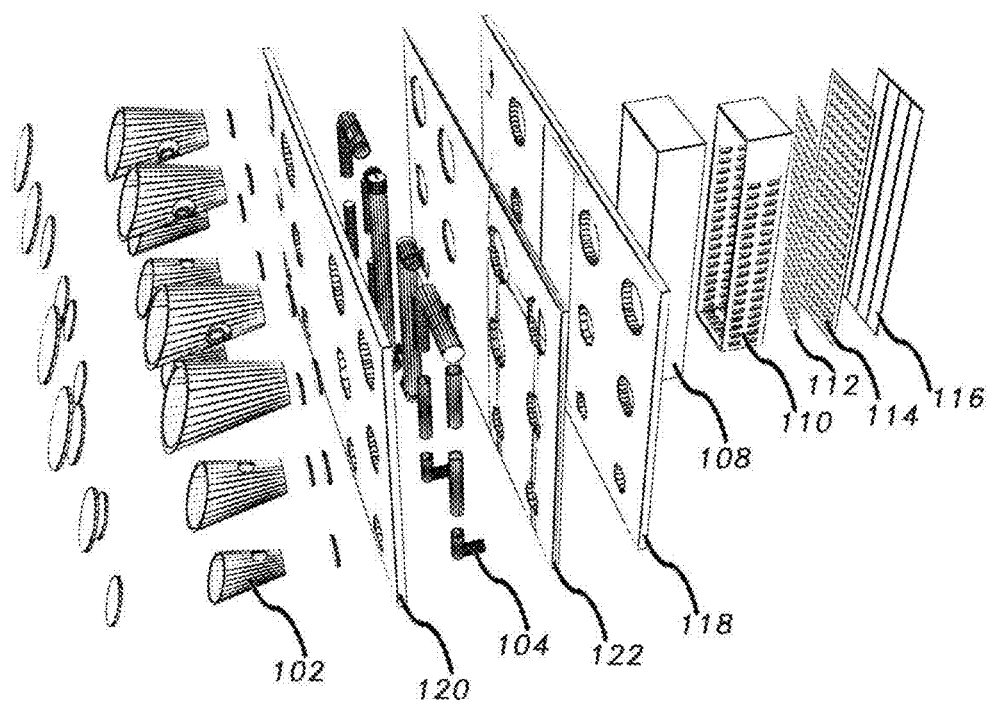

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

FIGS. 1-4 illustrate a heat generating solar window disclosed by prior art. The solar heat generating solar window includes a set of housing units 102, a set of pipes 104, a storage tank 106. The heat generating solar window is integrated into the wall of the building. To this end, the housing unit 102 is distributed across one or more of walls of the building. The building may include a residential building or a commercial building. The housing unit 102 includes a cylinder shape and is configured to receive cold air from the one or more of the set of pipes 104 located toward the bottom of the system. The cold air is heated within the housing unit 102 and the heated air is then transferred to the storage tank 106 via one of the set of pipes 104.

The housing unit 102 includes two glass sheets, a metal absorber, an insulator, and a ceramic cover. One the two glass sheets is located at one end of the housing unit 102 and the other is located at the other end of the housing unit 102, allowing the light to enter the housing unit and heat the metal absorbed. The metal absorber covers the insulator, which in turn covers the ceramic cover of the housing unit 102. The insulator prevents or reduces heat transfer from the metal absorber to the ceramic cover.

Once the cold air inside the housing unit 102 is heated, it may be transferred to the storage 106. The storage 106 may receive the heated air through the pipes 104. The pipes 104 may have several control valves. The control valves may include a cold air entrance control valve and a hot air exit control valve. The cold air entrance control valve control the entrance of the cold air into the solar window system. It may be located on the pipes 104 toward the bottom of the system. If hot air is not need, this valve may be closed to shut down the entrance of cold air to the system. The hot air exit control valve may be placed on the pipes 104 located adjacent to the storage 106. If closed, it prevents the hot air from the housing unit 102 to enter the storage 106. If opened, it allows the hot air from the housing unit 102 to enter the storage 106.

The storage 106 includes several housings. The outer housing 108 is made of PVC and is configured to collect the heated air via the absorbers in the housing unit 102 and transfer the heated air to the central part of the storage 106. The inner housing 110 includes holes within its body and is configured to draw the heated air stored in the outer housing 108 to inside of the inner housing 110. Inside the inner housing 110 a set of stones 112 may be located which may be heated as a result of this heat transfer. The inner housing 110 is also made of PVC so the heat does not escape from the interior of the inner housing 110. The exit door from the storage 106 is made of two layers.

The first layer 114 includes holes from transferring the heat from inside of the inner housing 110 to inside of the building. The second layer 116 is an insulator that is configured to slide over the first layer 114 and cover the holes of the first layer 116 to prevent the heat from escaping the inner housing 110. The storage 106 is placed inside the wall of the building. To this end, on one end the storage 106 is covered by a first wall 118 and on another end it is covered by a second wall 120. Between the first wall 118 and the second wall 120, an insulator 122 may be placed. The pipes 104 are also placed inside of the wall between the first wall 116 and the second wall 118.

The housing units 102 may not all be of the same size. In one specific example, the housing units 102 placed on upper side of the solar window system may be larger than the housing units 102 placed on a lower side of the solar window system.

The solar window system, as disclosed, can use solar energy for heating indoor spaces inside buildings and in addition for filtration of indoor air. The solar window system can store generated heat in a storage tank for further use. The disclosed solar window system can be installed in the building during construction and become part of the building.

The solar window system may include main components such as, for example, a set of heat generation encasements installed on walls of a building such that air inside each heat generation encasement is heated by solar energy; a storage tank for storing the heated air; and a set of connection pipes to draw cold air from an indoor space inside the building into the heat generation encasements, and transfer the heated air from the heat generation encasements to the storage tank.

Figure 3:
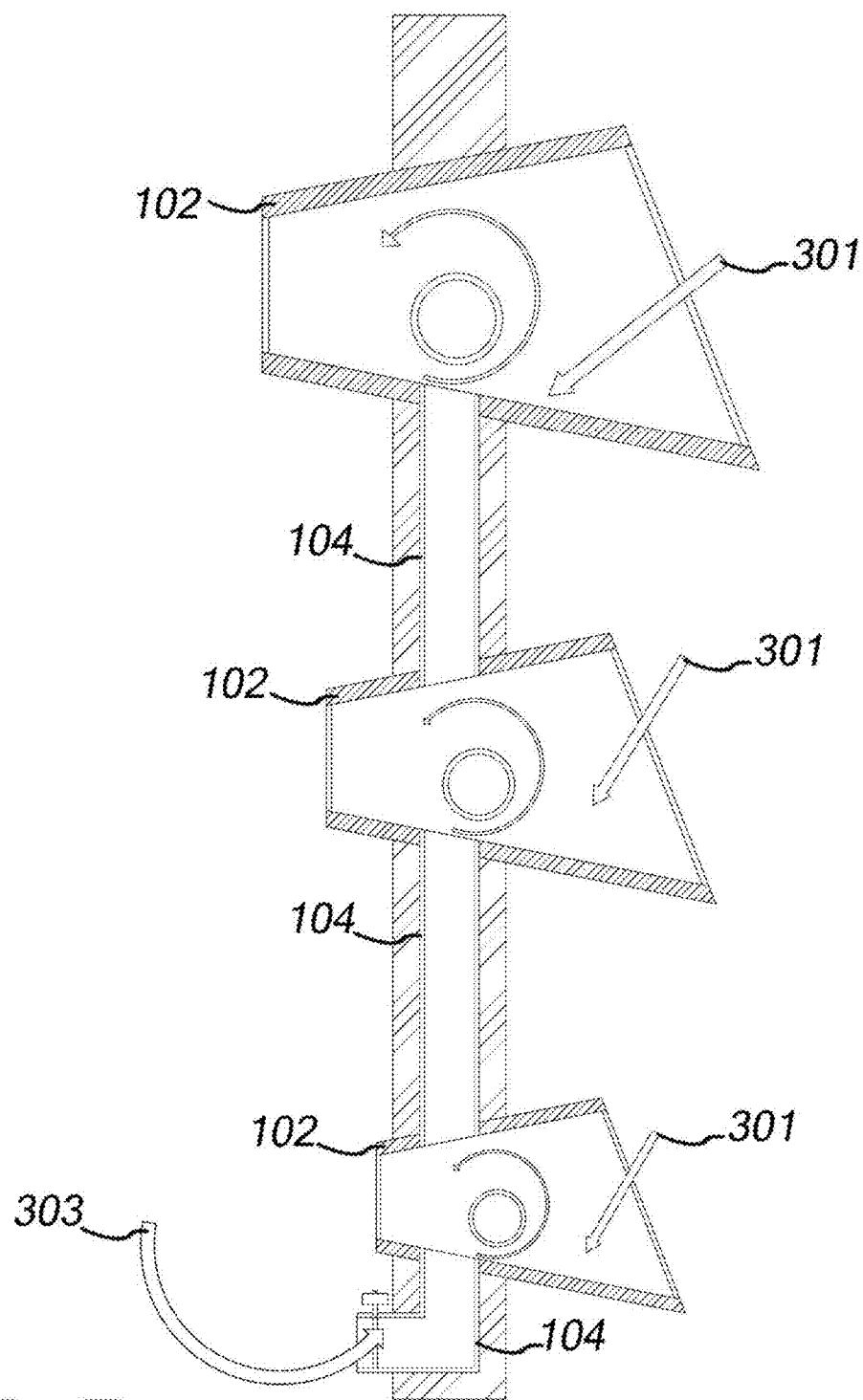
Figure 4:
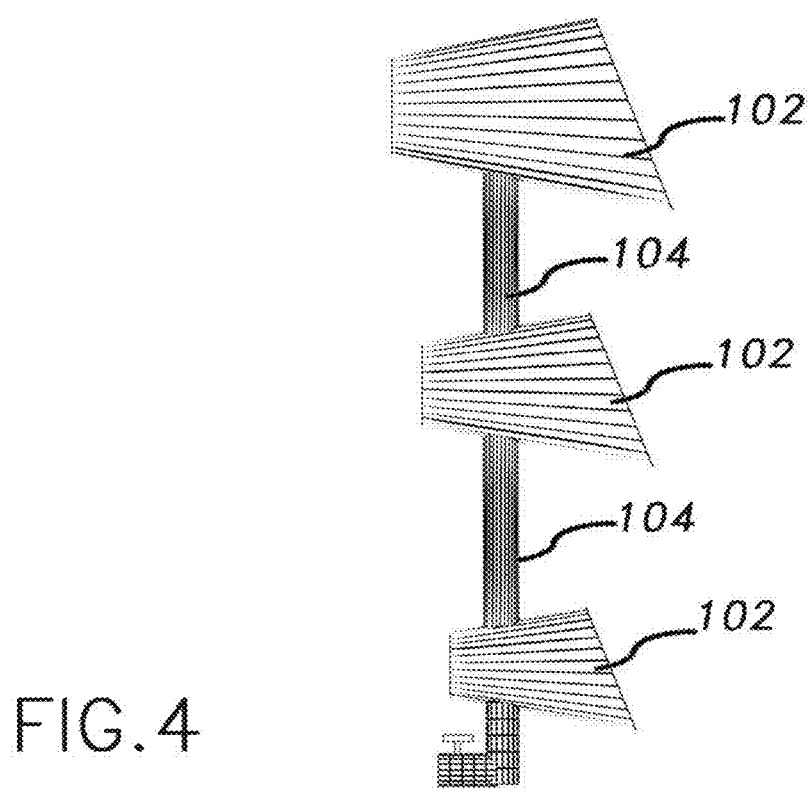

FIGS. 3 and 4 display a side view of a housing units 102 connected by a pipe 104. As shown in FIG. 3, air enters the pipe 104 from an opening 303. The air flows in pipe 104 into housing units 102 and is heated by the sun light shown as 301. The heated air is circulated within the housing units 102 and flows upward within pipe 104.

Figure 5:
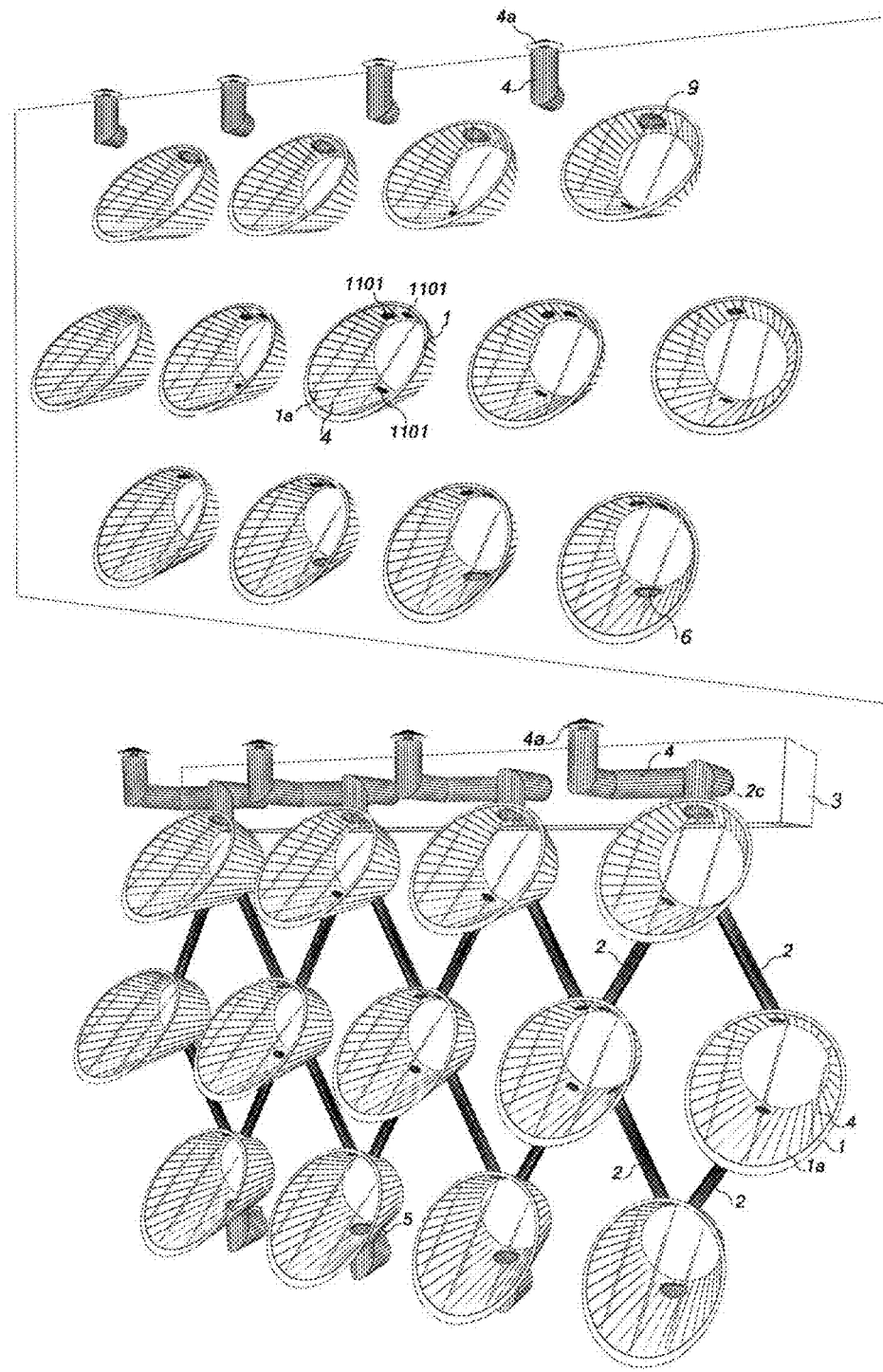
FIGS. 5-8 illustrate components of a solar window system, according to an implementation.
Figure 6:
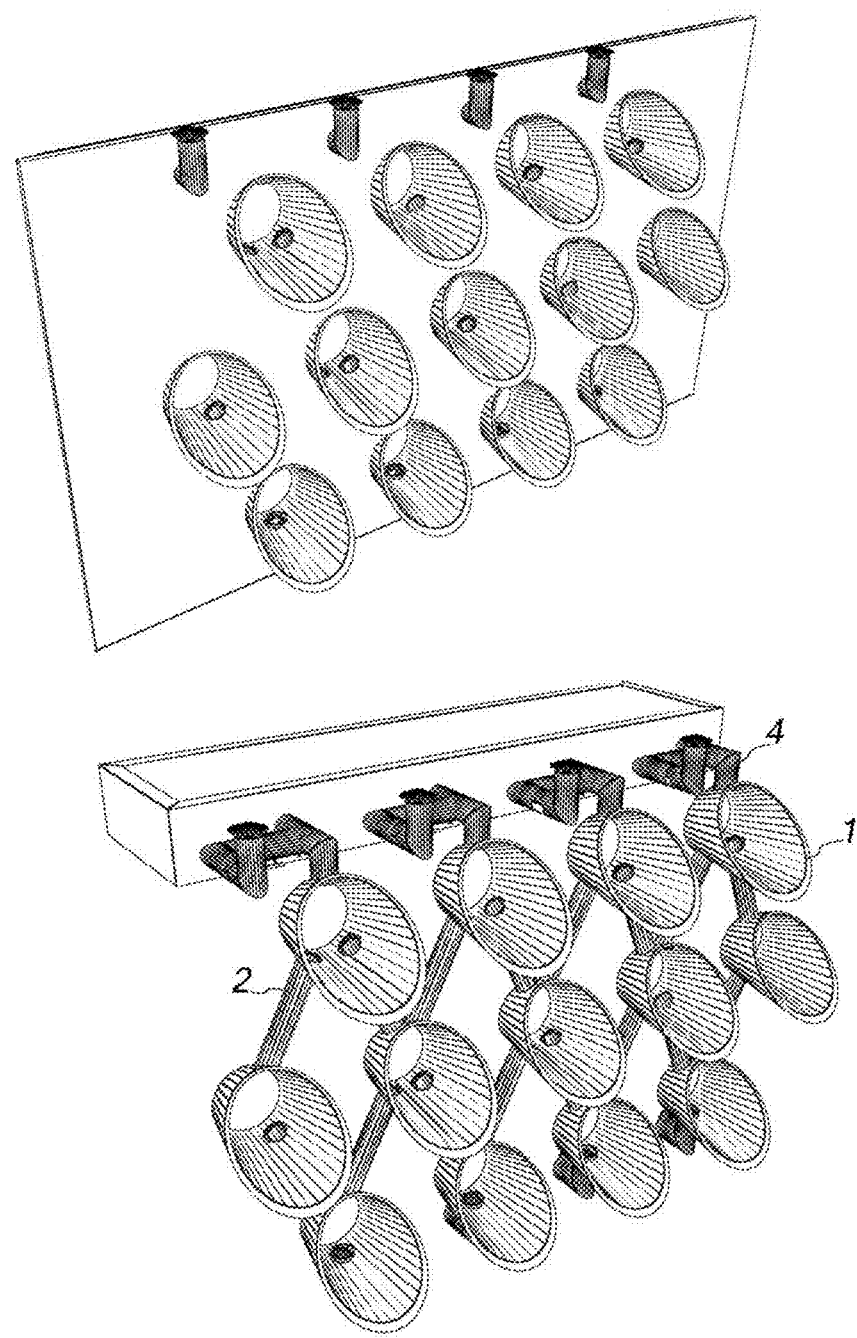
Figure 14:
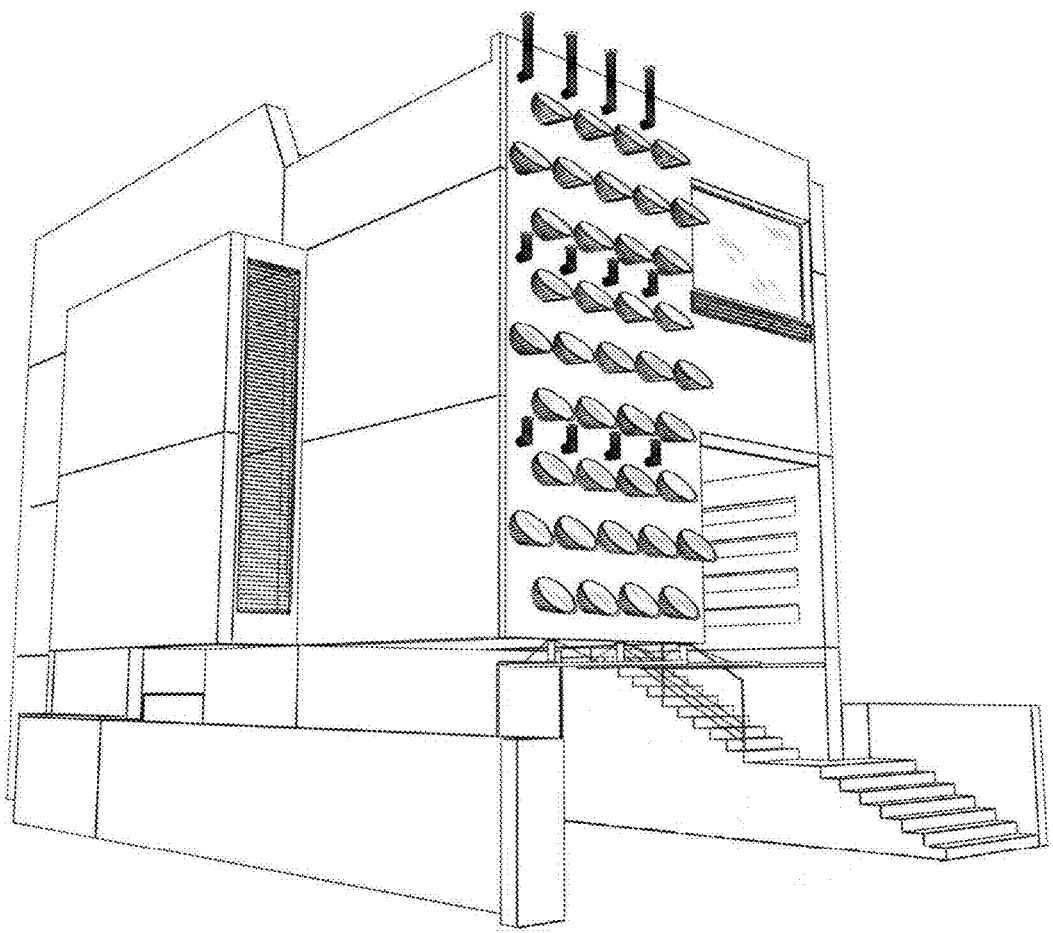
FIG. 14 illustrates an example of a solar window system installation on a wall of a building, according to an implementation.
Figure 15A:
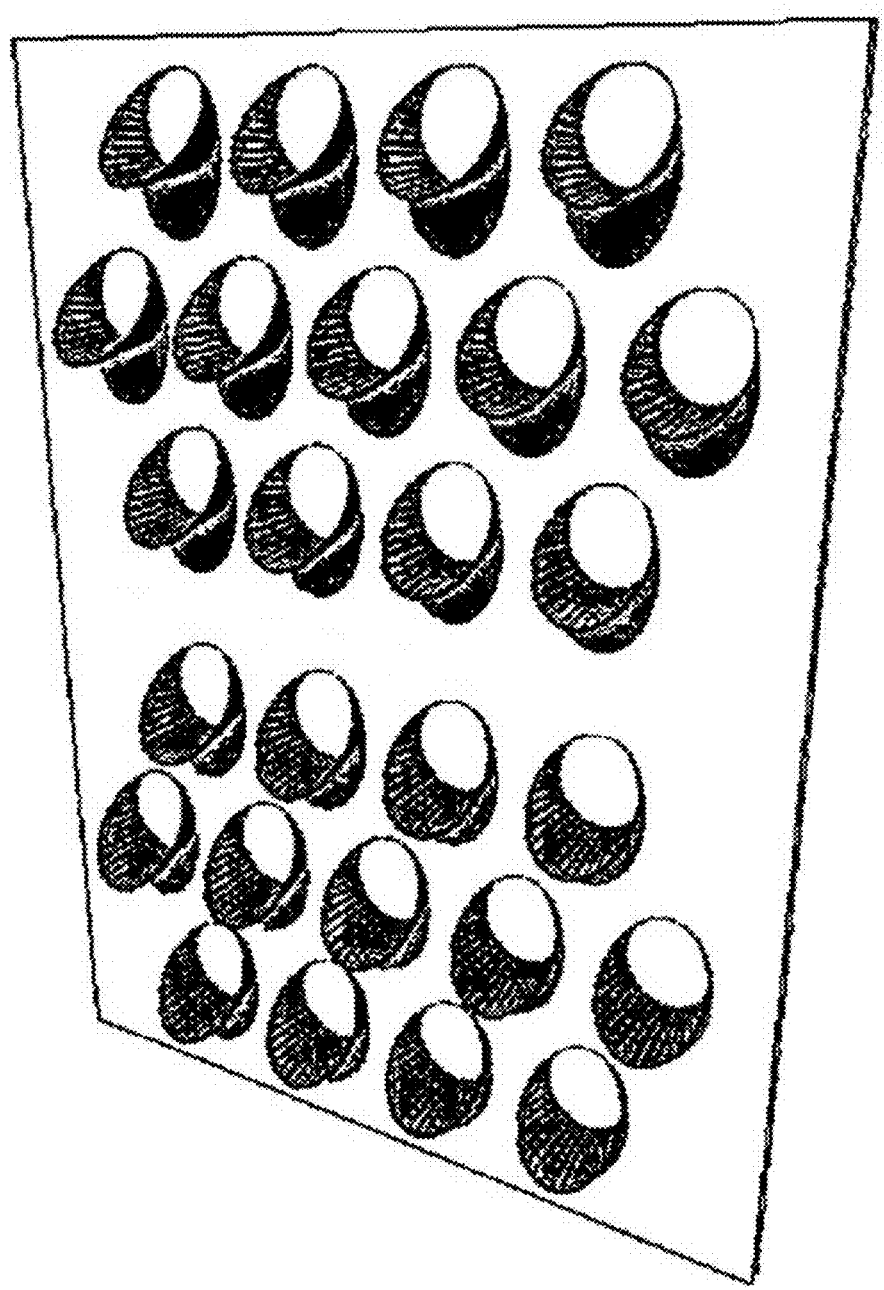
FIGS. 15A-15B and 16A-16B illustrate arrangements of heat generation encasements of the solar window systems on walls, according to an implementation.
Figure 15B:
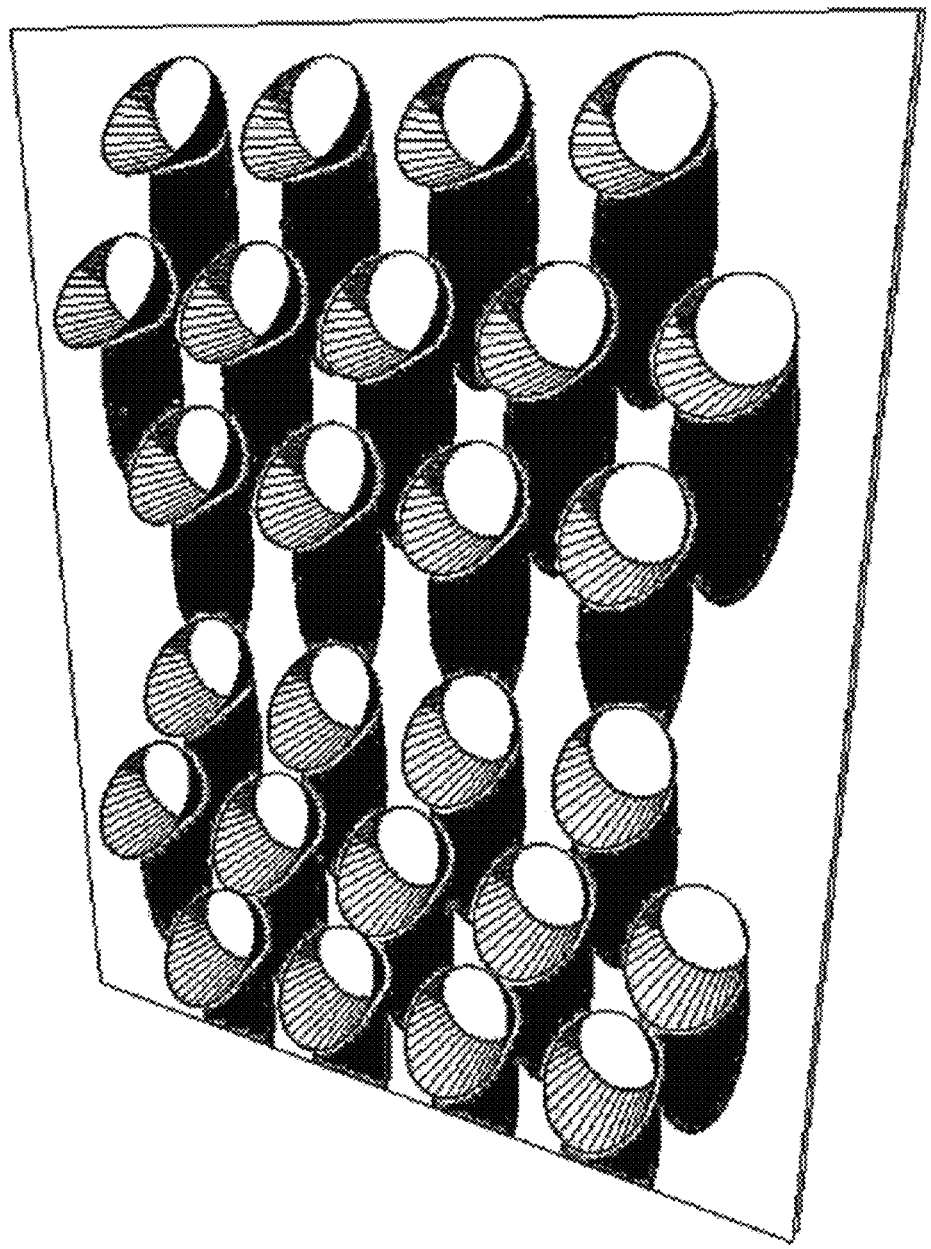
Figure 16A:
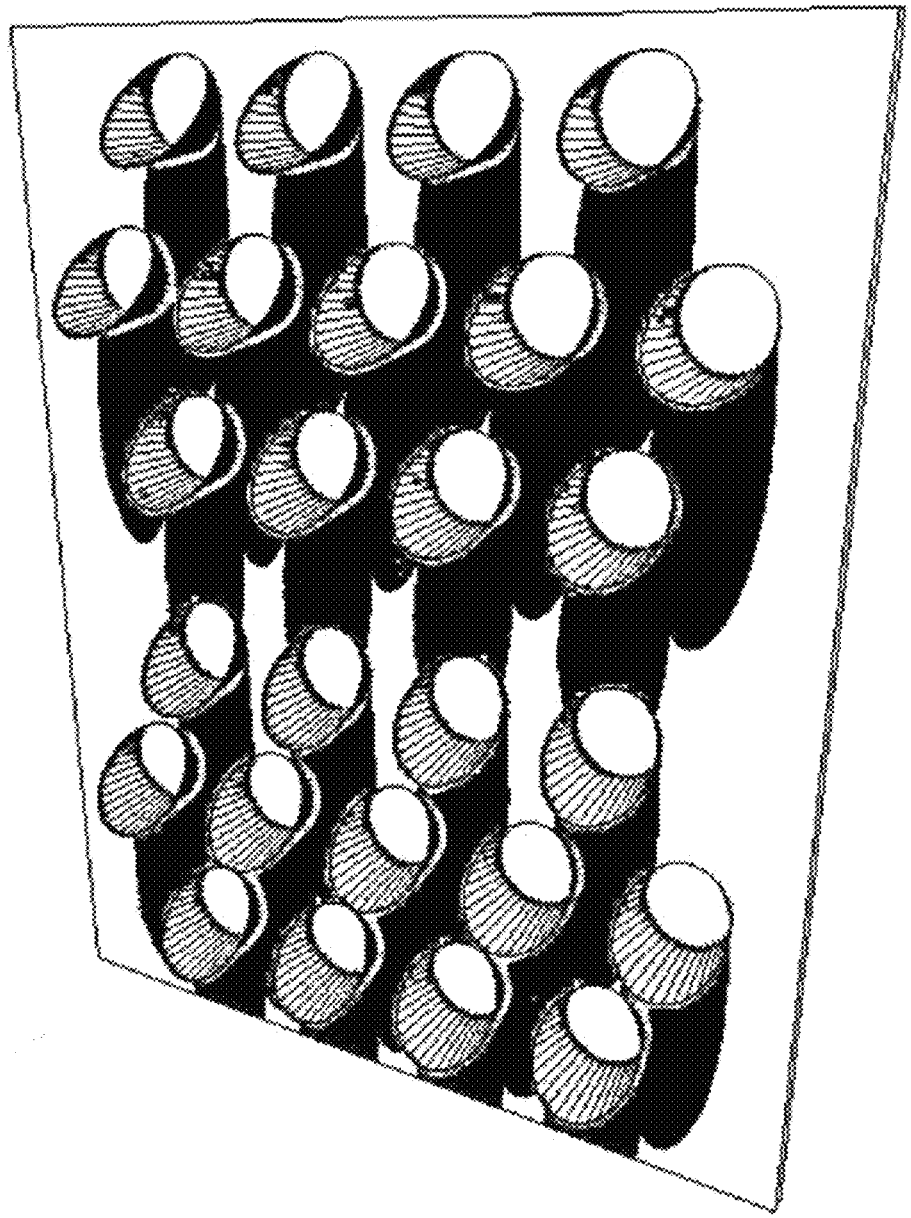
Figure 16B:
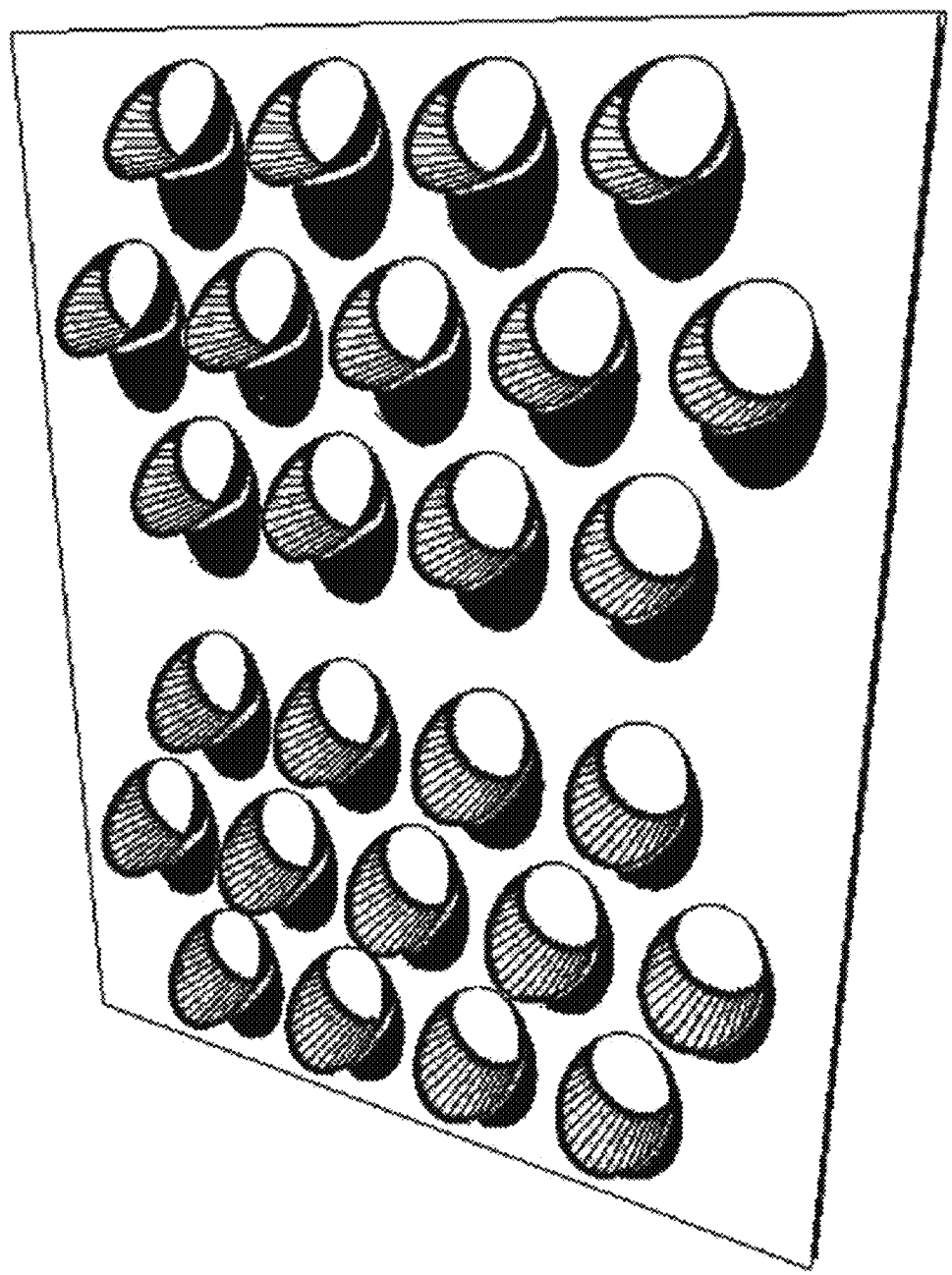
Figure 17A:
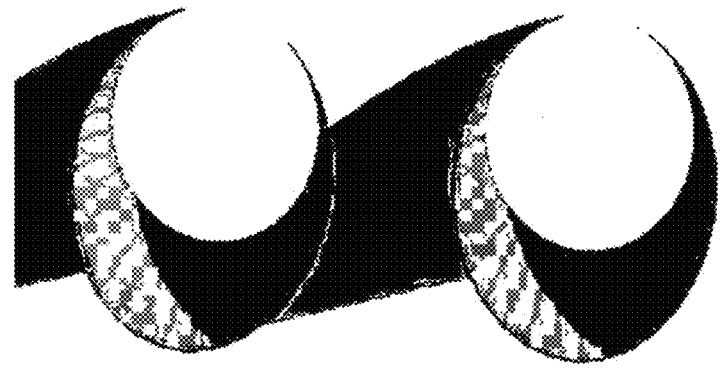
FIGS. 17A-17C and 18A-18B illustrate an effect of heat generation encasement shadows on adjacent heat generation encasements, according to an implementation.
Figure 17B:
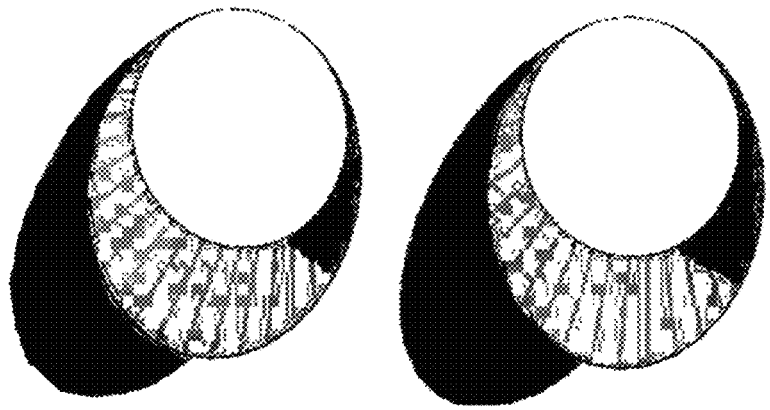
Figure 17C:
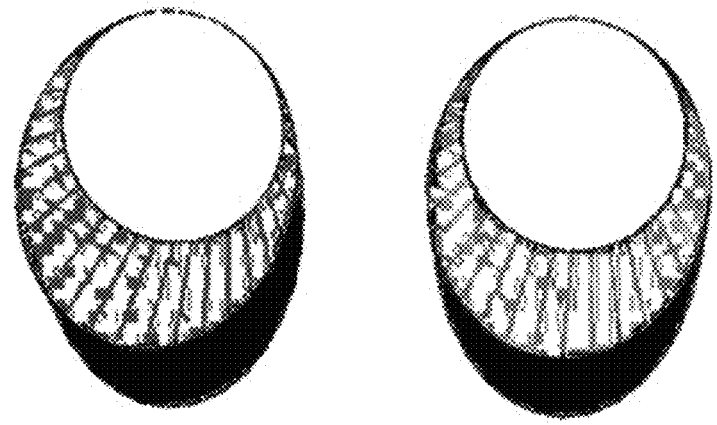
Figure 18A:
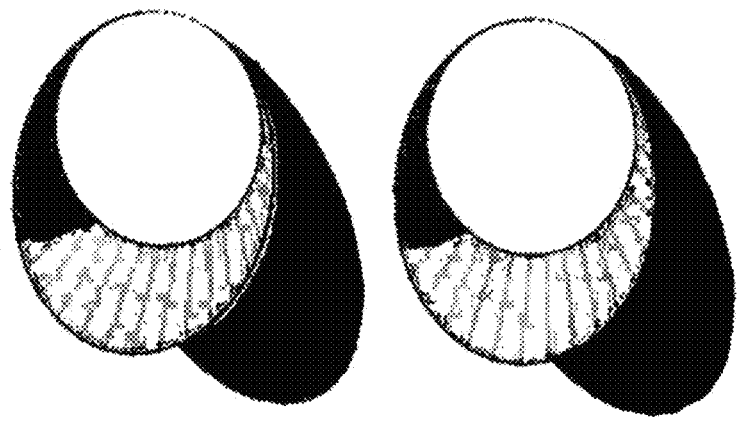
Figure 18B:
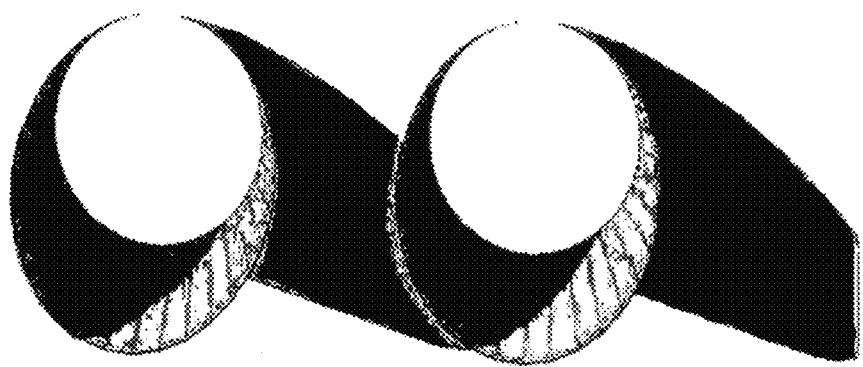

The solar window system may include multiple window openings or heat generation encasements shown as 1 in FIGS. 5-8. Each heat generation encasement can have a cylinder shape made from reinforced concrete covered with glass sheets on both ends with an angular cut on the end to provide an angle towards the sunlight such that a highest possible amount of solar energy is absorbed. Different views from the heat generation encasements are shown as number 1 in FIGS. 5-8. As shown in FIGS. 5, 6 and 14, a set of heat generation encasements can be installed on a wall surface to provide heat, light and air conditioning to the indoor space surrounded by the wall.

Figure 7:
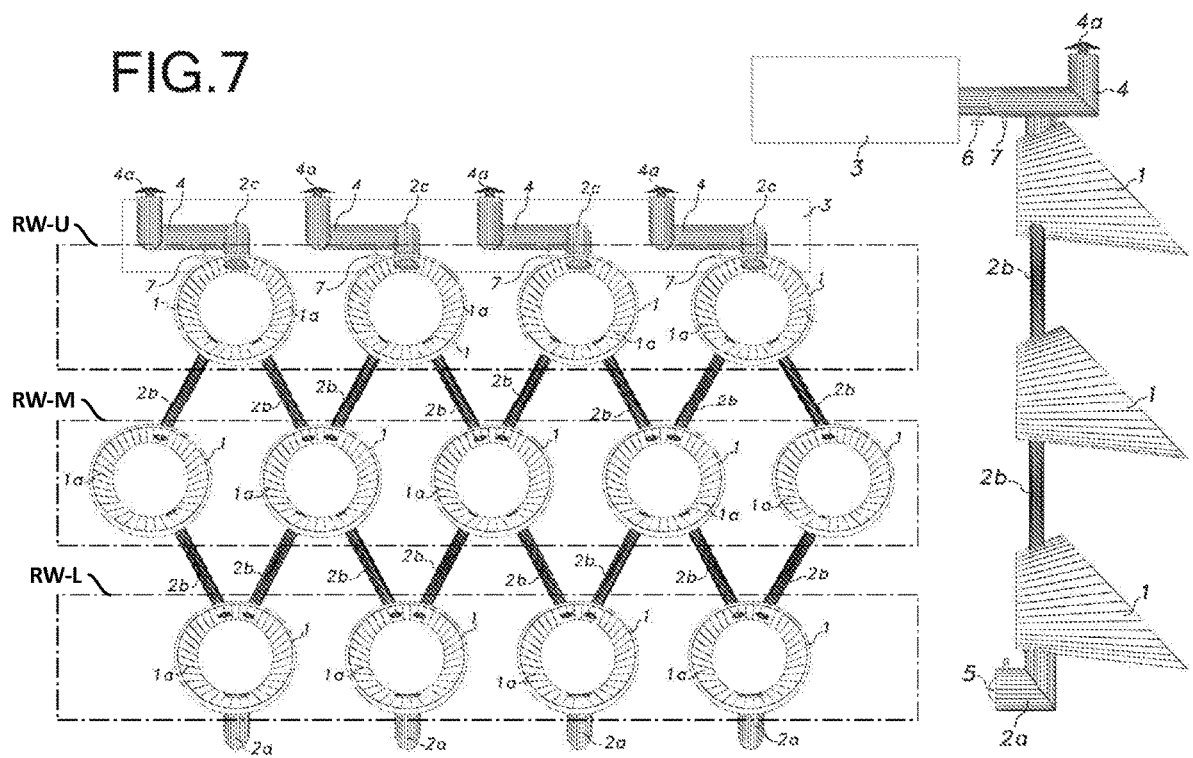
Figure 9:
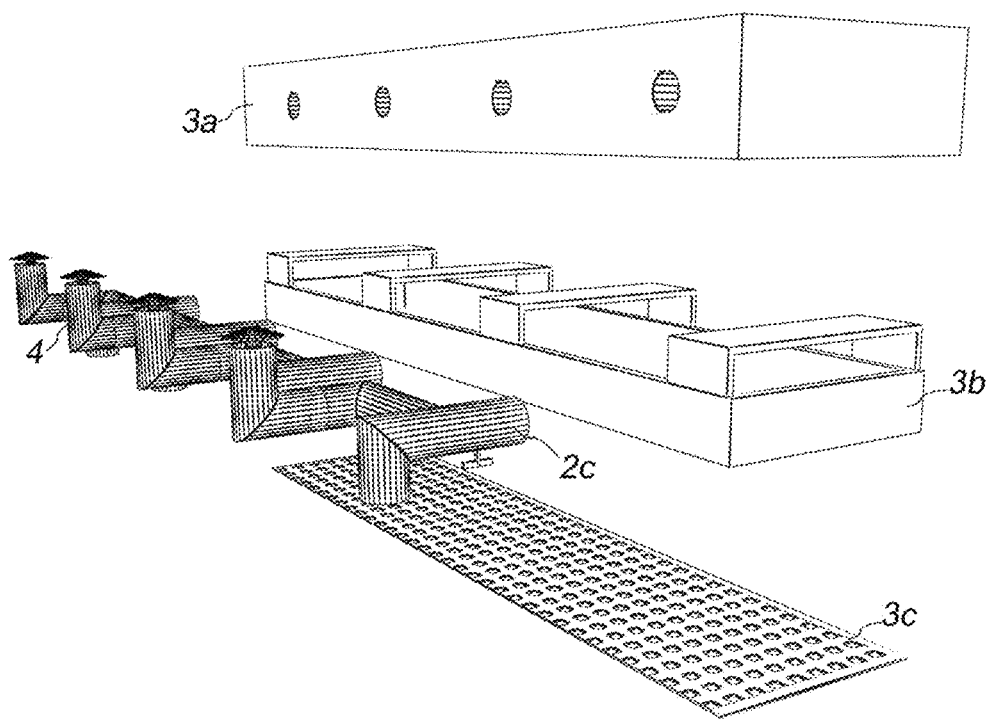
FIG. 9 illustrates a heat storage tank of a solar window system, according to an embedment.

A heat generation encasement 1 may include various components such as, for example, anti-reflective glass (shown as D in FIG. 10) on both ends of the heat generation encasement, a metal sheet (shown as A in FIG. 10), covering the inner surface of the heat generation encasement for heat absorption, and an insulator layer (shown as C in FIG. 10) installed between the heat absorption metal sheet and the concrete heat generation encasement. The insulation layer C prevents heat from being wasted by heating the concrete. As visible in FIG. 7, the set of connection pipes 2 can include a first subset 2a, a second sunset 2b, and a third subset 2c. The first subset connection pipes 2a can function as input for receiving cold air from the indoor space and feeding it to a lower row, labeled RW-L, of the heat generation encasements 1. As visible in FIG. 7, a plurality of the second subset connection pipes 2b can function to transfer heated air, from the lower row RW-L of heat generation encasements 1 upward to a mid-row, labeled RW-M, of the heat generation encasements 1. Another plurality of the second subset connection pipes 2b can function to transfer heated air upward from the mid-row RW-M of heat generation encasements 1 to an upper row, labeled RW-U, of the heat generation encasements 1. As shown in FIGS. 5, 7, and 9, third subset connection pipes 2c can function to transfer heated air from the upper row RW-U of heat generation encasements 1 into the storage tank 3. As shown in FIG. 7, each heat generation encasement 1 can be directly connected to 2 or 4 other heat generation encasements 1 via second subset connection pipes 2b.

Both ends of the heat generation encasements can be covered with anti-reflective glass such that a maximum possible amount of the sunlight reaches the metal sheet and to prevent the generated heat to escape the heat generation encasement. The anti-reflective glass can be glass with 3 millimeter thickness and the anti-reflective property of the glass can be provided by coating the glass with nano material (e.g., nano-coating).

The light waves reaching a sheet of glass are partly absorbed, partly pass through and partly reflected. Experiments have shown that a clean and colorless glass reflects less light than a dirty or colored glass. It has been shown that clean glass can pass 70 percent more light than a dirty glass. For increasing the amount of light absorbed by the solar window system, the reflection of light should be decreased, while the amount of light passing through the glass is increased.

Nano-technology provides anti-reflective material. For example, a thin layer of porous silica can be attached to glass to provide anti-reflective (AR) property for the glass. The AR layer can increase glass clarity up to 98 percent. In addition, the AR glass may have anti-static property, which can prevent absorption of debris to the glass due to static electricity. As a result the amount of heat generation from solar energy can be increased by up to 15 percent. The glass can be attached to both ends of each heat generation encasement. Glass sheet with 3 millimeter thickness can be used and installed on the heat generation encasement by using chassis made from metal or from compact high-strength plastic. The space between the glass and the chassis can be filled by a sealant or a gasket (D as shown in FIG. 10), to prevent air leakage from the heat generation encasement.

Figure 12:
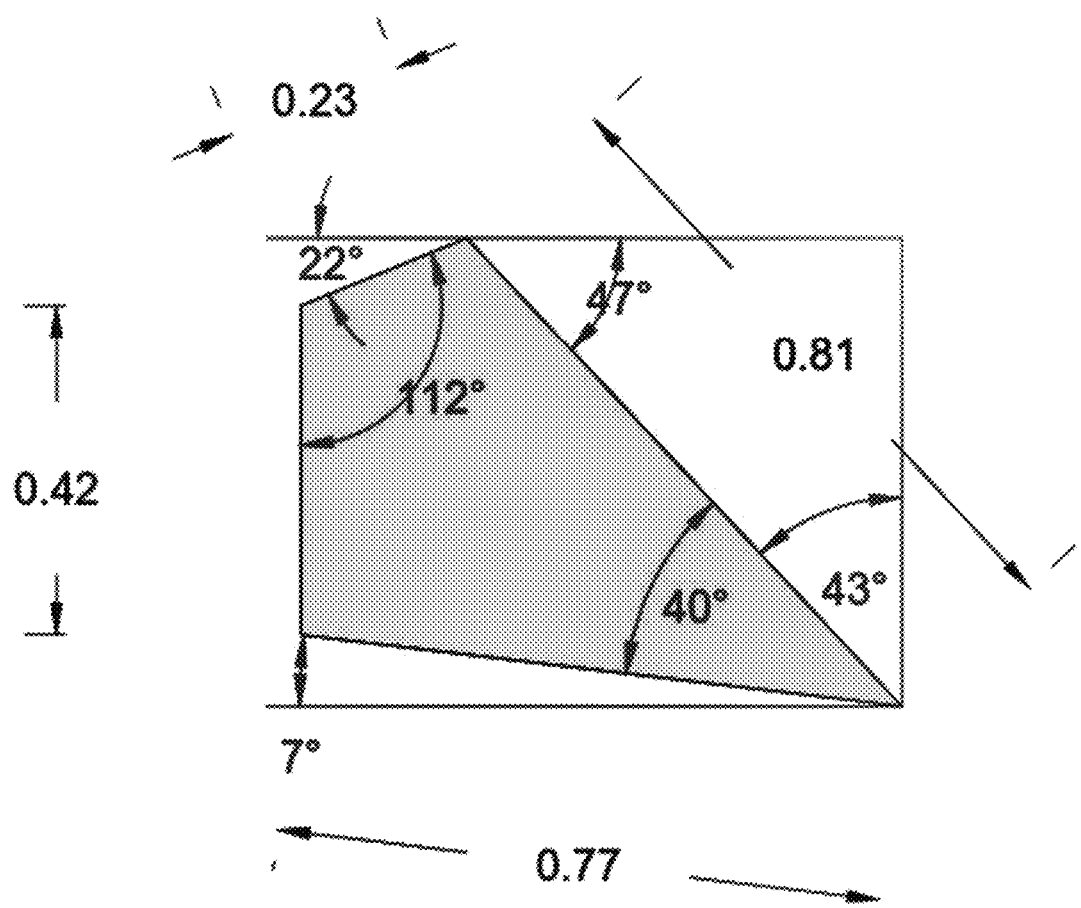
FIG. 12 illustrates a direction of the solar window system towards sunlight, according to an implementation.

The metal sheet A can be heated by sunlight and as a result the air inside the concrete heat generation encasement 1 surrounding the metal sheet is heated. The hot air expands due to heat and transferred upward into other heat generation encasements 1 via connection pipes 2b shown in FIG. 7. As shown in FIGS. 7 and 12, a concrete heat generation encasement 1 can be positioned towards the sunlight with an angle determined based on a latitude of the building location. The angular position of the concrete heat generation encasements against the sunlight can affect the amount of solar energy entering the solar window system. The angular position of the concrete heat generation encasements can be adjustable and adjusted based on the latitude of the geographic area of installation.

Figure 10:
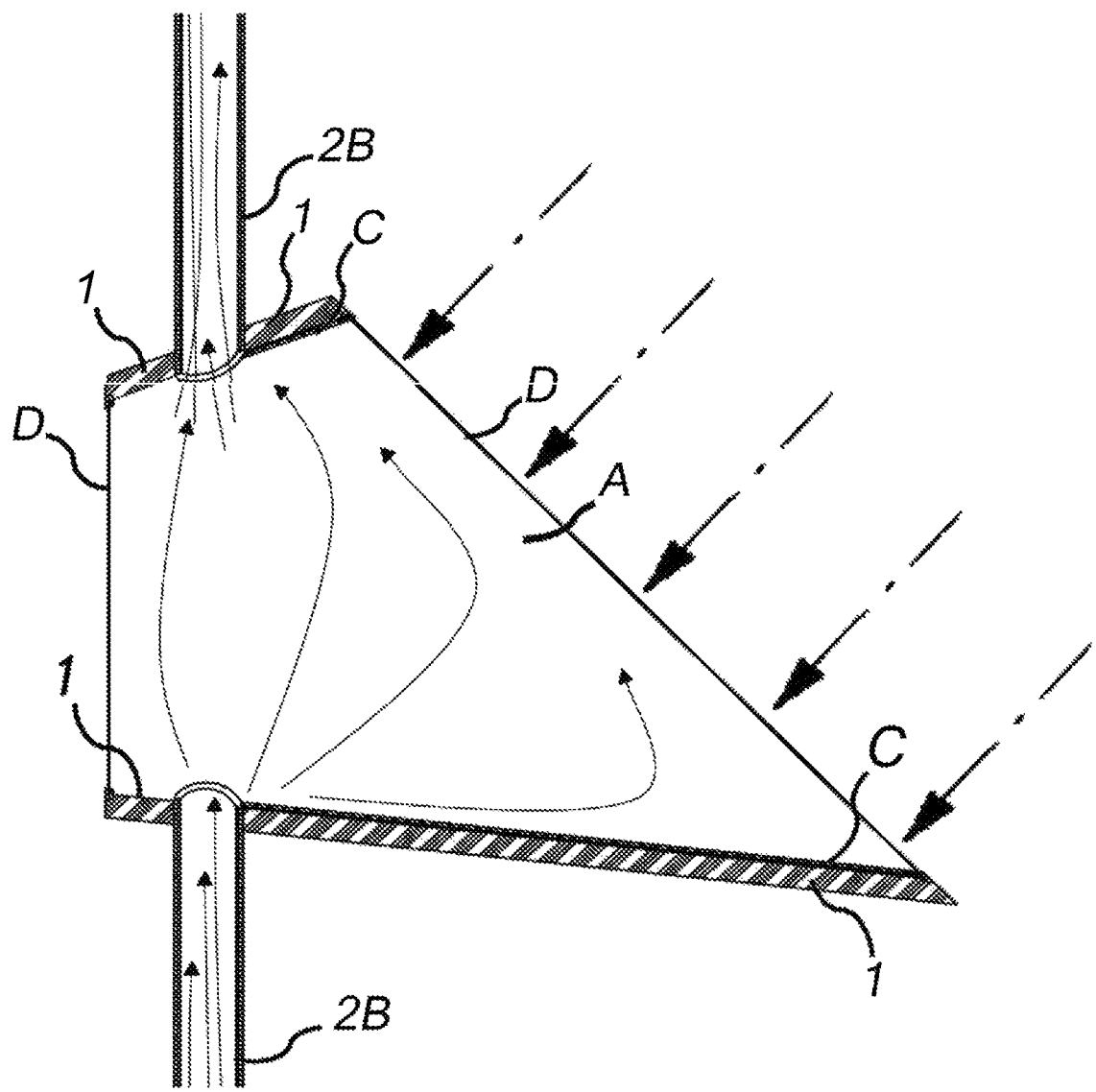
FIGS. 10-11 illustrate a heat generation encasement of the solar window system, according to an implementation.

The absorption metal sheet shown as A in FIG. 10, can be made from metals with dark and/or matt color because dark and matt surfaces can be heated up to 39 degrees centigrade more than light colored surfaces. Metals previously used as heat absorption layers include, copper, white iron, galvanized pipes, aluminum, steel and bronze. Copper has a higher thermal conductivity than other metals. In addition, copper corrosion can easily be prevented.

Item B in FIG. 10 shows an expansion seam or gap. The metal sheet may expand upon heating and the expansion may cause damage to other components of the concrete heat generation encasement. The expansion gap B can prevent damage to the glass and/or the glass and glass frame due to expansion of the metal sheet. The expansion gap B can be provided as a gap between the metal sheet and the glass and/or between the metal sheet and the concrete cylinder and filled with a flexible insulator such as plastic or cork to absorb the expansion force of the metal. The insulation can prevent pressure from expanded metal sheet to damage other parts of the concrete heat generation encasement. A layer of insulation material (shown as C in FIG. 10) can be placed between the heat generation encasement and the metal sheet to prevent the heat collected inside the heat generation encasement to be wasted.

Figure 8:
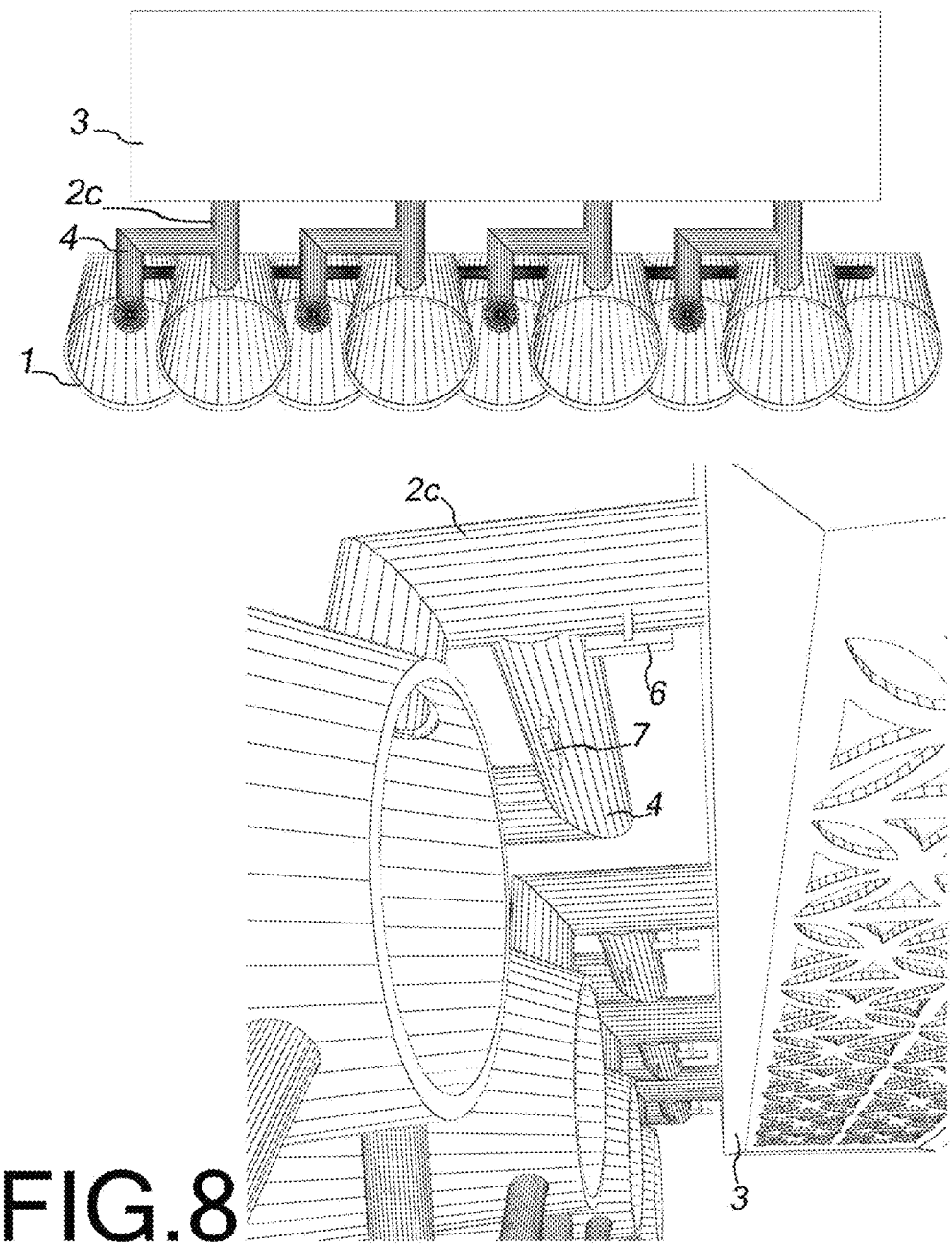

Another main component of the solar window system is a storage tank 3 shown in FIGS. 7 to 9. As shown in FIG. 9, the storage tank 3 may include an outer storage 3a made from metal blades (e.g., Aluminum blades); an inner storage 3b made from metal and filled with sand or metal filings or a mixture of sand and metal filings to store heat. The storage tank 3 may also include a porous layer 3c through which hot air is transferred from the storage tank 3 to the indoor space inside the building. An empty space or gap may separate the inner storage 3b and the outer storage 3a. The gap can provide air circulation between the inner storage and the outer storage, as shown in FIG. 9. The heat stored in the storage tank 3 during the day time can be used to provide heat for indoor spaces.

Another main component of the solar window system is a set of connection pipes 2 (2a, 2b, and 2c) shown in FIGS. 5-8. The connection pipes 2 can transfer air between the heat generation encasements 1 and the storage tank 3. The connection pipes 2 can be made from polyvinyl chloride (PVC). The connection pipes 2a shown in FIG. 7 can function as input for receiving cold air from the indoor space into the heat generation encasements 1 of the solar window system and heating up the cold air in the encasements 1. The connection pipes 2a draw in the cold air into the solar window system. An input control switch can be installed at the entrance of the cold air into the system to prevent the cold air from entering the system, if desired by an operator. Due to high density, cold air stays below the hot air in a vertical setup. The solar window system may include connection pipes 2a installed in the lowermost part of the window and in the indoor space to draw the cold air in the solar window system. The suction of the air is generated in the solar window system when the heated air with density lower than the cold air moves upwards.

Figure 11:
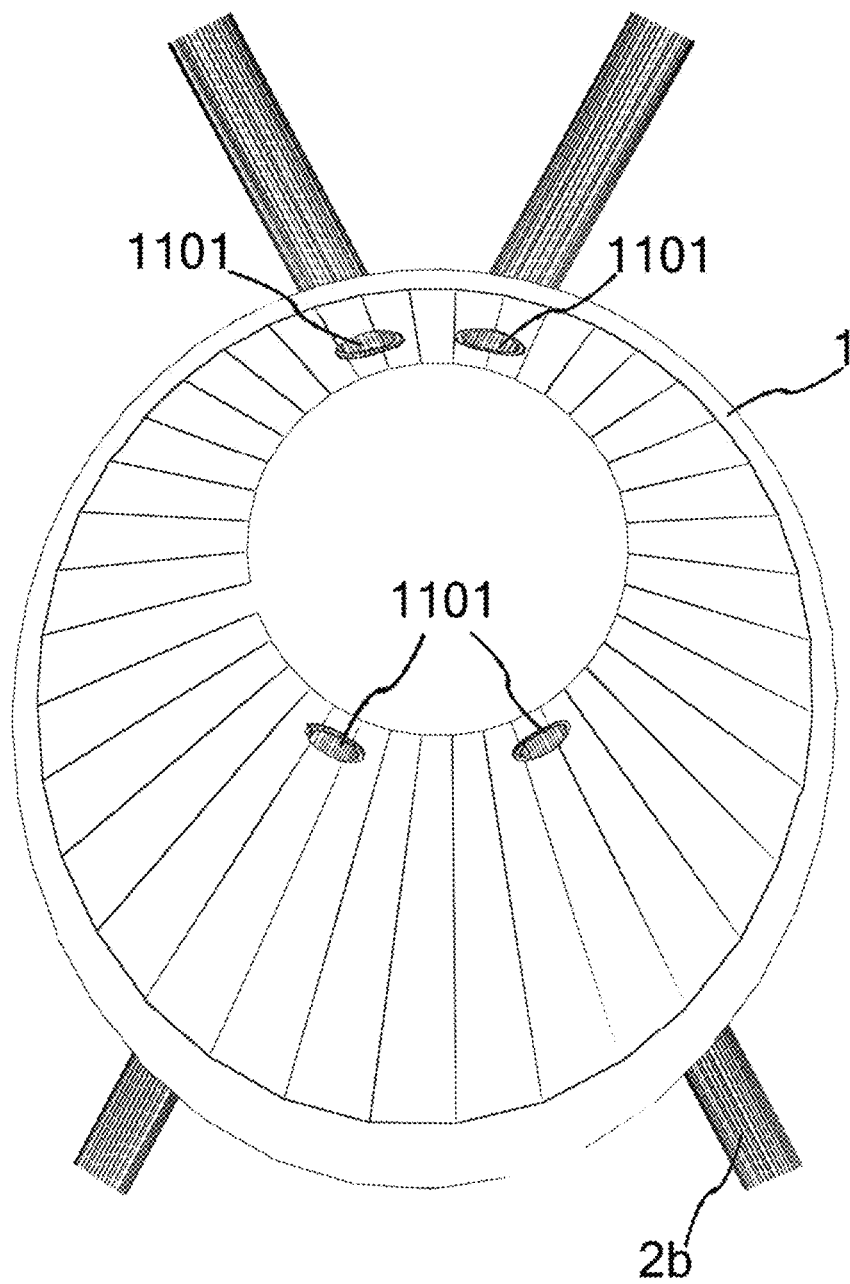

A heat generation encasement 1 can have openings 1101, as shown in FIG. 11, for installing the connection pipes. These openings can be on the top or bottom part of the encasement. The openings may be threaded such that the connection pipes are screwed inside the opening. The connection pipes can have threaded ends to be screwed into the threaded openings on the heat generation encasements.

In addition, the connection pipes 2b of FIG. 7 connect the heat generation encasements 1 to each other, for exchange of hot air heat among the heat generation encasements. The connection pipes 2c shown in FIGS. 7 and 8 transfer the heated air into the storage tank 3. The connection pipes 2a or 2c may have a larger diameter than pipes 2b such that a high volume of heated air can be easily transferred to the storage tank 3 (via 2c) and a high volume of cold air can enter as input (via 2a). A filter (e.g., a heat resistant filter) and a fan (e.g., a timer fan) can be installed at the entrance point of the storage tank 3 to filtrate the air. The fan can circulate the air and can be timed and programmable based on for example, air quality, the indoor current temperature and required temperature, the temperature trend in the geographical area, etc.

Various impurities inside the building such as, for example, undesirable smells, dust, mold, chemicals, gases, germs and allergens can affect the air quality. The solar window system can draw the air from the indoor space, heats the air and filtrates the heated air prior to entering the storage tank 3 via connection pipes 2c.

Figure 19:
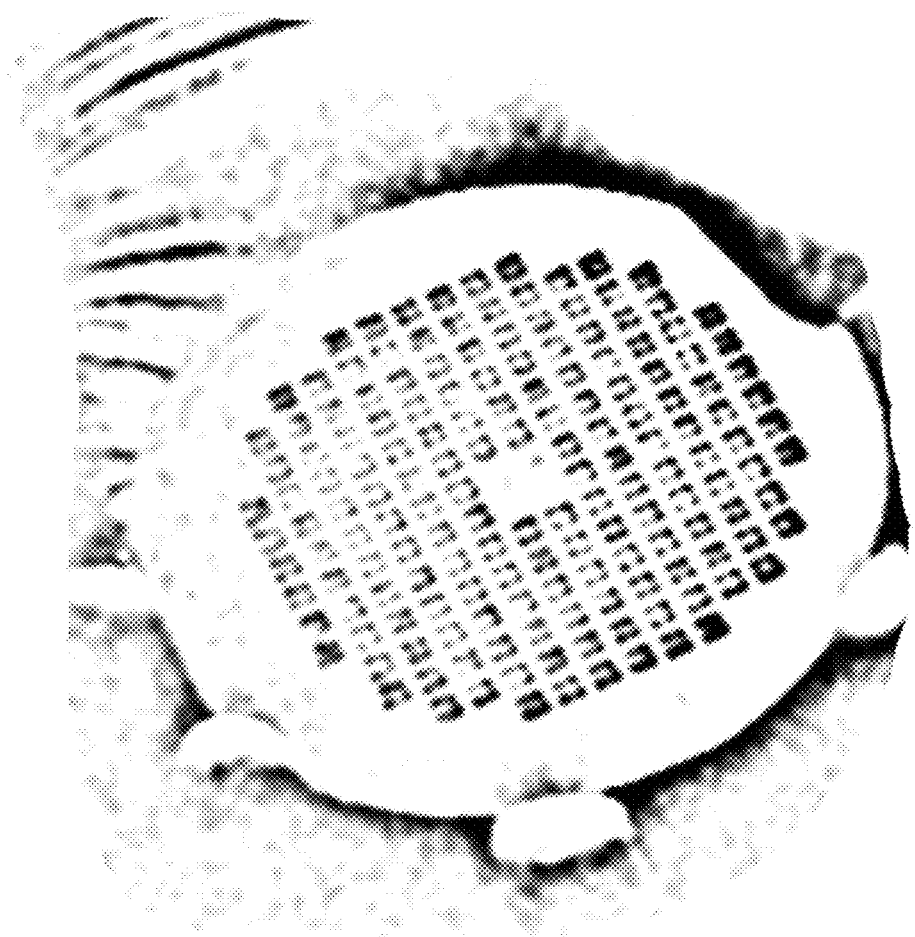
FIG. 19 illustrates a filter of the solar window system, according to an implementation.

The fan can circulate the air inside the solar window system by blowing the air into the filter and the filter can entrap the larger polluting particles in the air. The filter can be replaceable and made from cotton, foam, fiberglass, or other synthetic or natural heat resistant fibers. High efficiency particulate air filters can be used to entrap 97 to 99 percent of particles larger than 0.3 microns. The filter may be a filter with nano membrane. A nano membrane filter is shown in FIG. 19. The filter can be removed for cleaning or replacement with a new filter.

A storage control switch can be connected to the fan such that when no hot air is needed in the indoor space, the storage control switch can be turned off. In such case a chimney control switch can be turned on to start a solar chimney (shown as 4 in FIGS. 5 to 9) to direct the hot air to the outside. In some instances, a chimney control switch, input control switch or a storage control switch can be automatically turned on or off based on other ones of the switches. For example, the storage control switch may be automatically turned off when the chimney control switch is turned on, or the storage control switch and the chimney control switch may be automatically turned off when the input control switch is turned off. In some other instances any of the switches may be controlled manually by an operator from the indoor space.

A solar chimney 4 including a set of exhaust pipes, as shown in FIGS. 5 to 9 that discharge the hot air from the indoor space to outside space (e.g., outside the building). For example, in the warm season when hot air is not needed, a storage control switch of the connection pipe attached to the storage tank can be turned off (2c in FIG. 8) and a chimney control switch of the exhaust pipes leading air towards outside space, can be turned on (4 in FIG. 8). In such cases, the solar window system receives hot air from the indoor space and/or from the heat generation encasements and guides the hot air outside. The exhaust pipes may be made of metal to be heated up by the sun light. An exhaust pipe may also have a metal bonnet (4 in FIG. 7). The bonnet can be heated up by the sunlight and a heated exhaust pipe and bonnet can provide faster discharge of the air from the indoor space to outside space.

Figure 13:
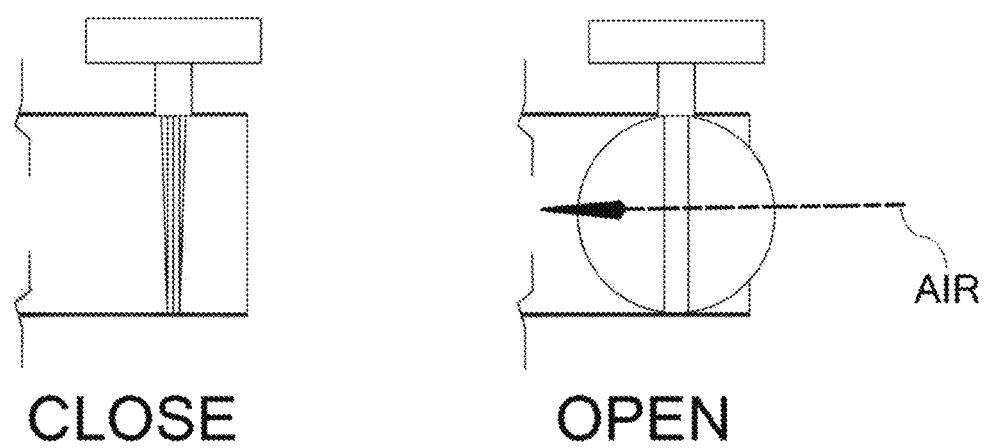
FIG. 13 illustrates a control switch of a solar window system, according to various implementations.

As shown in FIG. 7, the connection pipes 2a for inputting the cold air into the solar window system can be located at a lower part of the solar window system, because the cold air has a higher density compared to hot air. The input control switch shown in FIG. 13 can be installed at the location where cold air enters the system. In cases when no hot air, air filtration, or air conditioning is needed for the indoor space, the solar window system can be turned off. In such cases, the input control switch can be turned off to stop the cold air from entering the solar window system. The input control switch can be turned on and off manually by an operator or automatically, for example by a timer or based on a current temperature in the indoor space.

The input control switch when turned off can also stop air circulation inside the solar window system. In addition, a storage control switch can be installed at the entrance point of the hot air to the storage tank 3 before the filter and the fan. When no hot air is needed, and the solar window system is desired to be used as an air conditioner, the storage control switch can be turned off. In such cases, a chimney control switch can be turned on such that the hot air from the heat generation encasements is directed to and released outside the building. The input control switch, storage control switch and chimney control switch can be made from high density plastic material. In addition, gaskets made from flexible plastic can be installed around a switch to prevent air leakage through the switch. The switches can be operated electronically using intelligent technique.

The storage tank 3 of the solar window system can be placed on the building roof or on the ceiling of rooms inside the building. Due to upward movement of hot air, a roof/ceiling tank can be heated faster and more efficiently. The roof/ceiling tank does not obscure view from the window and does not occupy external wall surface. As a result more wall space can be available for placing heat generation encasements on the wall.

In warm seasons when a need for heating is not required, the solar window system can be used as a solar chimney for ventilation of the indoor air and exchanging the indoor air with fresh air from outside. The solar chimney is shown as 4 in FIGS. 5 to 9

As shown in FIGS. 15A, 15B, 16A, 16B, 17A, 17B, 17C, 18A, and 18B the heat generation encasements can be arranged on the wall such that obstruction of light reaching each encasement by shadows of other adjacent encasements is minimized and a high amount of direct sunlight can reach each encasement.

The disclosed solar window system may have main functionalities such as, providing natural light for indoor spaces, providing filtered heated air in cold weather, and providing air conditioning by the solar chimneys in hot weather. The generated heat can also be stored in storage tank 3. The storage tank may preserve the heat using sand or metal filings (e.g., iron filings) or a mixture of sand and metal filings. For air filtration, a filter can be installed at the input of the storage tank to purify the generated hot air prior to entering the storage tank.

The disclosed solar window system draws in the air as input, heats up and filters the air and returns the air to the environment as output. The air ventilation by the solar window system can purify the air in polluted areas and help reduce allergies and lung problems due to air pollution.

The process of heat generation by the disclosed solar window system includes, providing an absorption surface to heat up from solar energy, transferring the heat from the absorption surface to an interface fluid (e.g., air), and storing the heat in a storage tank. The solar window system includes multiple heat generation encasements which are installed in the building as windows or sunlight absorption components as shown as item 1 in FIGS. 5 to 8. In addition to heat, these heat generation encasements provide natural light for lighting the indoor space.

The disclosure provides multiple advantages such as a structure for providing a combination of controlled light and heat from solar energy such that each of the solar light and the solar heat can be used without having negative effect on each other. The disclosed solar window system provides low cost heat and air conditioning and prevents air pollution caused by using fossil fuels. This system is part of the building and does not require extra space. The disclosed solar window system can be used in every season as heater, air conditioner, solar chimney and air purifier.

The separation of various system components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A solar window system for a building, comprising:
   a plurality of heat generation encasements, wherein air inside each heat generation encasement is heated by solar energy to be a heated air;
   a storage tank for storing the heated air; and
   a set of connection pipes, wherein the set of connection pipes includes a first subset of connection pipes, a second subset of connection pipes and a third subset of connection pipes, wherein:
   the first subset of connection pipes is configured to draw cold air from an indoor space inside the building into the plurality of heat generation encasements,
   the second subset of connection pipes is configured to connect each of the plurality of heat generation encasements to at least two other heat generation encasements from the plurality of heat generation encasements, and
   the third subset of connection pipes is configured to transfer the heated air from the plurality of heat generation encasements to the storage tank, wherein a heat generation encasement among the plurality of heat generation encasements is directly connected to four other of the plurality of heat generation encasements via four connection pipes among the second subset of connection pipes, each of said four connection pipes among the second subset of connection pipes directly connecting said heat generation encasement to a corresponding different one of the four other heat generation encasements.

2. The solar window system of claim 1, wherein the storage tank comprises:
an outer storage made from metal blades;
an inner storage made from metal and filled with sand, metal filings, ora mixture of sand and metal fillings to store the heated air, wherein an empty space separates the inner storage and the outer storage; and
a porous layer through which the heated air is transferred from the storage tank to the indoor space inside the building.

3. The solar window system of claim 2, further comprising:
a fan installed at an entrance point to the storage tank where the heated air from the plurality of heat generation encasements enters the storage tank via the third subset of connection pipes, such that the fan provides circulation of the heated air to the indoor space inside the building.

4. The solar window system of claim 3, wherein the fan is a timer fan.

5. The solar window system of claim 3, further comprising:
a filter installed at the entrance point to the storage tank in front of the fan, in a configuration wherein that the heated air circulated by the fan passes through the filter and purifies prior to entering the storage tank.

6. The solar window system of claim 1, wherein at least one of the plurality of heat generation encasements includes a concrete cylinder and further includes:
two glass sheets, each of the two glass sheets covering a different one of two ends of the concrete cylinder;
a metal sheet covering an inside surface of the concrete cylinder, the metal sheet being configured to produce heat from sunlight entering through at least one of the two glass sheets; and
an insulation layer placed between the concrete cylinder and the metal sheet, in a configuration to prevent heating of the concrete cylinder.

7. The solar window system of claim 6, wherein the two glass sheets are anti-reflective glass sheets and provide light to the indoor space.

8. The solar window system of claim 6, wherein the metal sheet has a matt dark color for high absorption of solar energy.

9. The solar window system of claim 6, wherein the metal sheet covers the inner surface of the concrete cylinder with a gap between the metal sheet and the concrete cylinder on each end of the metal sheet, wherein the gap is filled with flexible insulators that are configured to allow the metal sheet to expand when heated.

10. The solar window system of claim 1,
wherein the first subset of connection pipes and the third subset of connection pipes have larger diameters than the second subset of connection pipes.

11. The solar window system of claim 10, wherein connection pipes in the first subset of connection pipes are located closer to a ground level compared to connection pipes in the second subset of connection pipes, and connection pipes in the second subset of connection pipes are located closer to the ground level compared to connection pipes in the third sub set of connection pipes.

12. The solar window system of claim 1, further comprising:
a solar chimney including a plurality of exhaust pipes and a chimney control switch, wherein when the chimney control switch is turned on, the plurality of exhaust pipes are opened and the heated air from the plurality of heat generation encasements is released outside the building.

13. The solar window system of claim 12, further comprising:
a storage control switch, configured to stop the transfer of the heated air from the plurality of heat generation encasements when turned off.

14. The solar window system of claim 13, wherein the storage control switch is automatically turned off when the chimney control switch is turned on.

15. The solar window system of claim 14, further comprising:
an input control switch, wherein when the input control switch is turned off, drawing the cold air from the indoor space inside the building into the plurality of heat generation encasements is stopped.

16. The solar window system of claim 15, wherein the storage control switch and the chimney control switch are automatically turned off when the input control switch is turned off.

17. The solar window system of claim 1, wherein:
a first plurality of the heat generation encasements are arranged as a lower row, a second plurality of the heat generation encasements are arranged as a mid-row above the first plurality of the heat generation encasements, and a third plurality of the heat generation encasements are arranged as an upper row above the second plurality of the heat generation encasements,
the storage tank extends parallel to and above the upper row arrangement of the third plurality of the heat generation encasements, and
each of the third plurality of heat generation encasements is directly connected to the storage tank by a corresponding one among the third subset of connection pipes.

* * * * *